Feb. 15, 1944. T. W. SUKUMLYN 2,341,827
OPTICAL UNIT
Filed Oct. 7, 1941

INVENTOR
Thomas W. Sukumlyn
BY John Flam
ATTORNEY

Patented Feb. 15, 1944

2,341,827

UNITED STATES PATENT OFFICE 2,341,827

OPTICAL UNIT

Thomas W. Sukumlyn, Los Angeles, Calif.

Application October 7, 1941, Serial No. 413,964

7 Claims. (Cl. 88—1)

This invention relates to optics, and more particularly to lenses or reflectors having curved surfaces.

Lenses and reflectors are of course utilized for altering the directions of light rays, respectively by refraction and reflection. Such devices may be generically referred to as optical units, and this term as used hereinafter will be utilized to include both lenses and mirrors or reflectors.

When the focal length of such a unit is so short as to provide a wide relative aperture for the optical unit, certain interference effects have been noted. These interference effects have been the subject matter of investigation by eminent physicists, and are perceptible as to those rays which converge at points removed from the axis of the unit. These interference effects improve the resolving power by destroying the outer portion of the diffraction pattern.

It is one of the objects of this invention to make it possible to improve the optical performance of such units, causing the unit to have high resolving power and to produce a more brilliant image.

In order to accomplish these results, a very thin optical wedge is formed over the optical surface, and arranged so as to alter the length of the optical path, by values always considerably less than the average wave length of light; and even less than half of such wave length. The wedge obviously must be extremely thin to fulfill this requirement. The optical wedge is such that its thickness is a function of the position of a generatrix revolved about the axis of the unit. In other words, assuming that a section as made of the optical wedge along a cylinder having its axis coincident with the axis of the unit, then the thickness of the wedge along such a section is a continuous function of the angle of the radius of the cylinder.

In addition, the thickness of the wedge along a section passing through the axis, also varies with the radial distance of the point of the wedge from the axis.

The theoretical considerations upon which the improved optical results are secured by such a wedge in conjunction with the optical unit are complex, and need not be detailed herein. The wedge may be refracting or reflecting, depending upon the character of the optical unit.

It is another object of this invention to provide an optical unit with a superimposed wedge of extreme thinness and of the geometric characteristics defined above.

It is still another object of this invention to provide a simple and inexpensive process for depositing wedges of this character upon the optical unit.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawing.

Figure 1:
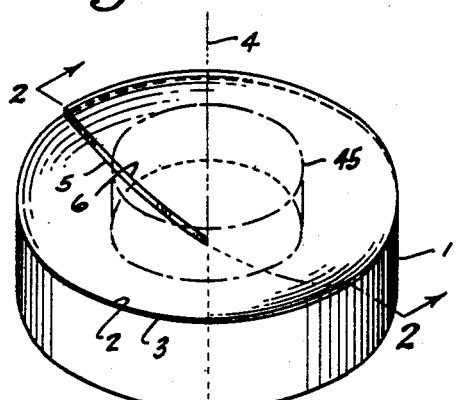
Figure 1 is a pictorial view of an optical unit incorporating the invention, one of the dimensions being greatly exaggerated for the sake of clarity.
Figure 2:
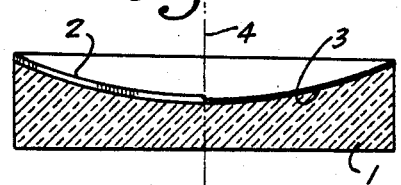
Fig. 2 is a sectional view taken along plane 2—2 of Fig. 1.

In the form of the invention illustrated in Figs. 1 and 2, the optical unit is shown as a concave lens or mirror 1. The unit is built up by the depositing of a supplemental layer 2 over a true surface of revolution 3, which may be formed by a generatrix rotated about the axis 4 of the unit. This supplemental layer 2, if the unit 1 is a lens, is formed of transparent material such as quartz or the like. The deposit may be secured by subjecting the surface of revolution 3 to a stream of vaporized material to be deposited.

The depth of the layer 2 is shown very greatly exaggerated. This depth is such that the difference between the maximum and minimum depths of the entire layer is such as to correspond to a change of optical path of not more than one average wave-length of light; and in some instances this difference in the optical path may be less than one-half such wave length.

The nature of the layer 2 is such that its thickness varies continuously for different angular positions of the intersecting plane which passes through the axis 4. If we consider plane 2—2 as a beginning position, then as this plane moves angularly in a counterclockwise direction, the thickness gradually increases until the intersecting plane again arrives at the beginning position. Since the thickness of the deposit increases from the beginning to the ending position, an abrupt step or discontinuity is formed, defined by the lines 5 and 6. The step between lines 5 and 6 corresponds to the maximum thickness of the layer. This maximum thickness represents the thick end of a circular wedge extending around the surface of revolution 3.

The effect of a supplemental layer is therefore that of an optical wedge having its thin and thick edges in a common plane radial to the axis 4 and passing through it. The thickness of the wedge increases gradually in a counterclockwise direction from the beginning position.

Figure 5:
Fig. 5 is a development of a section taken along a cylindrical surface 5—5 of Fig. 1.

This effect is shown most clearly in Fig. 5, which is the development of the cylindrical section taken along the cylindrical surface 45 indicated in Fig. 1. The minimum thickness at edge 7 is shown as at one extremity of the layer 2. The maximum thickness 8 of the layer 2 is shown at the opposite end of the figure.

Figure 3:
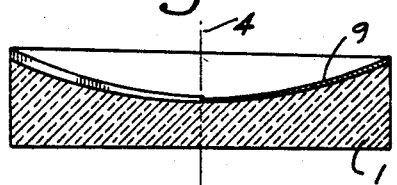
Fig. 3 is a sectional view similar to Fig. 2, of a modified form of the invention.

Although in this form of the invention the thickness of the layer 2 is uniform for any plane of the section, from the axis to the outer edge of the unit 1, it may be advisable to vary as well the thickness of the layer from the axis to the edge of the unit. Such a variation of the invention is illustrated in Fig. 3. In this case, the optical unit 1 has superposed thereon a supplemental layer 9. The thickness of this layer gradually increases from the axis 4 to the edge of the unit, in any plane of the section.

In the event that the optical unit is a reflector, then the supplemental layer 2 or 9 may be in the form of sputtered metal that forms a mirror deposit upon the unit.

Figure 4:
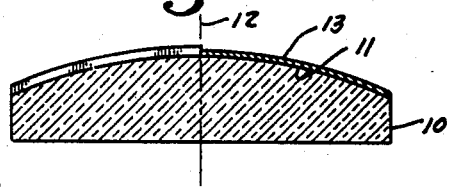
Fig. 4 is a sectional view similar to Fig. 2 of a further modified form of the invention.

The unit 1 is shown in the present instance as having a concave optical surface. In the form of the invention illustrated in Fig. 4 the unit 10 is provided with a convex optical surface 11, again formed as a true surface of revolution about the axis 12. The supplemental layer 13 is of the same character as illustrated in the previous forms described. In all these layers the maximum difference in optical path from the thinnest to the thickest part is substantially less than the average wave length of light, and preferably in some instances it may be less than one-half the average wave length of light.

Figure 6:
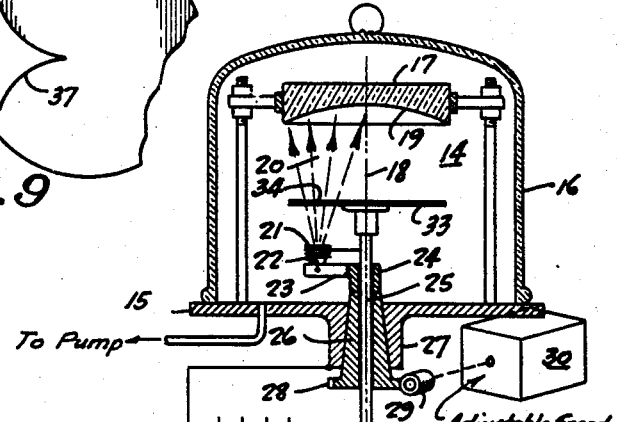
Fig. 6 is a diagrammatic view of apparatus utilized in connection with the process of forming the optical units illustrated in Figs. 1, 2, 3 and 4, and Figs. 7, 8 and 9 are plan views of various forms of shutters that may be utilized in connection with the apparatus illustrated in Fig. 6.

These extremely thin wedges thus superimposed upon true surfaces of revolution may be conveniently obtained by the aid of the apparatus disclosed in Fig. 6.

In that figure an evacuated space 14 is indicated including a stationary metallic base member 15 and a bell-like cover 16. An exhaust pump may be in continual operation for maintaining the space 14 at a sufficient low pressure. The optical unit 17 to be treated is shown as appropriately supported so that its axis is coincident with an axis 18 and with its optical surface 19 directed downwardly. This optical surface 19 is subjected to a stream 20 of finely divided material, emanating from a receptacle 21 located within the space 14. This material may be in the form of vaporized quartz or vaporized metal, heated as by an electric current. For example, a heating coil 22 may be utilized, in good heat conducting relation to the material to be vaporized that is located within the receptacle 21. The manner in which electrical energy is fed to the unit 21 will be described hereinafter.

The receptacle 21 is shown as carried by an arm 23 having a hub 24. This hub 24 is insulatingly supported upon a shaft 25 which projects out of the chamber 14. This shaft 25 is in turn insulated from a rotatable conical plug member 26 passing through an appropriate hub 27 in the bottom of the base 15. The axis of the shaft 25 is coincident with the axis 18 of the unit 17.

The lower edge of the plug 26 may be formed as a worm gear 28 adapted to be driven as by a worm 29. This worm 29 is shown diagrammatically as being operated by an adjustable speed device 30.

The shaft 25 is insulated from the rotatable plug 26, and can therefore be used as a connection for the electric heating unit 22. For this purpose one terminal of the heating unit is joined to the shaft 25 and its other terminal may be grounded upon the arm 23. A source of electricity, such as the battery 31, has one terminal connected to the boss 27 and its other terminal is connected by a brush 32 to the lower end of the shaft 25. The energy delivered by the battery 31 is such as effectively to vaporize the material in the receptacle 21. As the source of motion 30 rotates the receptacle 21, the stream of vaporized particles 20 is directed against the optical surface 19.

In order to regulate the area where vaporized material is deposited, a shield 33 is interposed between the receptacle 21 and the surface 19. This shield 33 may be in the form of a disk appropriately fastened to the upper end of the shaft 25. It is provided with a slit or opening 34 (shown in greater detail in Fig. 7) through which the stream 20 passes. As the shaft 25 is rotated through the medium of the plug 26, the gear 28 and the worm 29, the slit 34 remains in a proper operative relationship with the receptacle 21. By appropriate configuration of the slit 34, the thickness of the deposit formed upon the optical surface 19 may be regulated. The thickness from point to point of this layer may be further controlled by appropriate adjustment of the speed of the mechanism 30; this adjustment may be in the form of a continuous variation repeated cyclically for repeated revolutions of the shaft 25.

Figure 7:
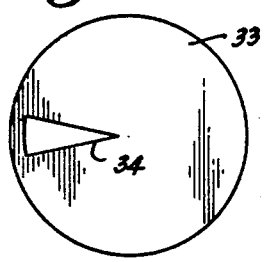

Thus if the slit 34 is of the form illustrated in Fig. 7, it is clear that a greater depth of the vaporized particles will be deposited nearer the edge than near the center of the optical unit 17. The radial extent of the slit 34 is furthermore so chosen that the stream 20 is quite well confined to extend no further than from the axis 18 to the outer edge of the unit 17.

By appropriate choice of the shape of the slit 34, different thickness effects may be obtained. A few of such variations are illustrated in Figs. 8 and 9.

Figure 8:
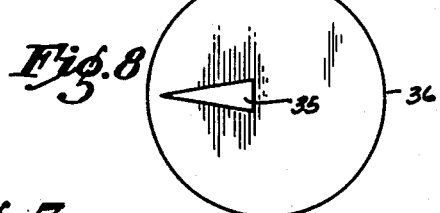
Figure 9:
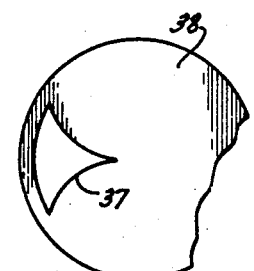

In Fig. 8 the slit 35 in the shield 36 is so arranged that a thicker deposit is formed adjacent the axis of the unit. In Fig. 9, the slit 37 in the shield 38 is so arranged as to ensure a considerably heavier deposit adjacent the edges of the unit 17.

If the speed of the mechanism 30 is varied continuously throughout each revolution, the amount of material deposited at any small area of the unit is proportional to the time of transit of the slit across the particular portion of the unit. Some control of the depth of the deposit is also obtained by the appropriate choice of the form of slit utilized.

The method of producing the optical units hereinabove disclosed is illustrated and claimed in a divisional application, Serial Number 493,740, filed July 7, 1943, in the name of Thomas W. Sukumlyn, and entitled "Method of making lenses or reflectors."

What is claimed is:

1. An optical unit having an axis and an optical curved surface characterized by the fact that there is a step or discontinuity corresponding to a low and a high place of the surface, said discontinuity extending transversely from the edge of the surface toward the axis, and the depth of the discontinuity being less than the average wave length of light.

2. An optical unit having an axis and an optical curved surface characterized by the fact that there is a step or discontinuity corresponding to a low and a high place of the surface, said discontinuity extending transversely from the edge of the surface toward the axis, and the depth of the discontinuity being less than the average wave length of light, and that any section of said surface in a plane passing through the axis, is that of a curved surface of revolution, and that there is a layer forming a supplemental thickness over said surface of revolution, and the thickness varying continuously from the axis to the edge of the unit.

3. An optical unit having an axis and an optical curved surface characterized by the fact that any section of said surface in a plane passing through the axis, is that of a curved surface of revolution, and that there is a layer forming a supplemental thickness over said surface of revolution such that the maximum difference of the optical paths corresponds to any two points of the layer is less than the average wave length of light, and the thickness varying continuously from the axis to the edge of the unit.

4. An optical unit having an axis and an optical curved surface characterized by the fact that any section of said surface in a plane passing through the axis, is that of a curved surface of revolution, and that there is a layer forming a supplemental thickness such that the maximum difference of the optical paths corresponds to any two points of the layer is less than the average wave length of light, and the thickness varying continuously from the axis to the edge of the unit, the form of the section varying continuously with the variation of the angle of the section plane with respect to the axis.

5. An optical unit having an axis and an optical curved surface characterized by the fact that the development of a section of the surface formed by any intersecting circular cylinder having an axis coincident with the axis of the unit, is in the form of wedge, the high portion of the wedge being less than the average wave length of light higher than the low portion.

6. An optical unit having an axis and an optical curved surface characterized by the fact that the development of a section of the surface formed by any intersecting circular cylinder having an axis coincident with the axis of the unit, is in the form of wedge, the high portion of the wedge being less than half the average wave length of light higher than the low portion.

7. An optical unit having an axis and an optical curved surface, characterized by the fact that a supplemental layer forms said surface, said supplemental layer being disposed over a surface of revolution, said optical surface having a step or discontinuity corresponding to a low and a high place of the surface, said discontinuity extending transversely from the edge of the surface toward the axis, the depth of the discontinuity being less than the average wave length of light, the depth of the layer also varying in any plane passing through the axis.

THOMAS W. SUKUMLYN.